United States Patent
Balagurusamy et al.

(10) Patent No.: US 11,557,033 B2
(45) Date of Patent: Jan. 17, 2023

(54) BACTERIA CLASSIFICATION

(71) Applicant: INTERNATIONAL BUSINESS MACHINES CORPORATION, Armonk, NY (US)

(72) Inventors: Venkat K. Balagurusamy, Suffern, NY (US); Vince Siu, Ontario (CA); Sahil Dureja, Austin, TX (US); Prabhakar Kudva, New York, NY (US); Joseph Ligman, Wilton, CT (US); Matthew Harrison Tong, Austin, TX (US); Donna N Eng Dillenberger, Yorktown Heights, NY (US); Ashwin Dhinesh Kumar, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 16/536,613

(22) Filed: Aug. 9, 2019

(65) Prior Publication Data
US 2021/0040530 A1 Feb. 11, 2021

(51) Int. Cl.
*G06K 9/00* (2022.01)
*G06T 7/00* (2017.01)

(52) U.S. Cl.
CPC .. *G06T 7/0012* (2013.01); *G06T 2207/10056* (2013.01); *G06T 2207/20036* (2013.01)

(58) Field of Classification Search
None
See application file for complete search history.

(56) References Cited

U.S. PATENT DOCUMENTS

| 10,255,693 B2 | 4/2019 | Smith |
| 10,266,867 B2 | 4/2019 | Son |
| 2015/0213599 A1 | 7/2015 | Buzaglo |
| 2018/0253591 A1 | 9/2018 | Madabhushi |
| 2018/0322660 A1 | 11/2018 | Smith |
| 2019/0241929 A1* | 8/2019 | Son ................... G01N 33/9446 |
| 2022/0156561 A1* | 5/2022 | Hong .................. G06V 20/698 |

OTHER PUBLICATIONS

Bedrossian et al., "A machine learning algorithm for identifying and tracking bacteria in three dimensions using Digital Holographic Microscopy." AIMS Biophysics, 2018, 5(1): 36-49. doi: 10.3934/biophy.2018.1.36, pp. 1-14.

Forero et al., "Automatic Identification of Mycobacterium Tuberculosis by Gaussian Mixture Models", J. Micros, 2006, Aug, 223 (Pt 2); 120-132.

Kim et al., "Rapid and label-free identification of individual bacterial pathogens exploiting three-dimensional quantitative phase imaging and deep learning." Apr. 3, 2019. https://www.biorxiv.org/content/10.1101/596486v1, pp. 1-20.

(Continued)

*Primary Examiner* — Soo Jin Park
(74) *Attorney, Agent, or Firm* — Kristofer L. Haggerty

(57) ABSTRACT

A method, a computer program product, and a computer system for classifying bacteria. The method comprises extracting a morphology signature corresponding to one or more bacteria and extracting a motility signature corresponding to the one or more bacteria. The method further comprises merging the morphology signature and the motility signature into a merged vector signature and classifying the one or more bacteria based on the merged vector signature.

12 Claims, 9 Drawing Sheets

(56) References Cited

OTHER PUBLICATIONS

Leal-Taixé et al., "Classification of Swimming Microorganisms Motion Patterns in 4D Digital In-Line Holography Data." In: Goesele M., Roth S., Kuijper A., Schiele B., Schindler K. (eds) Pattern Recognition. DAGM 2010. Lecture Notes in Computer Science, vol. 6376. Springer, pp. 283-292, 2010.

Linder, "Mobile Diagnostics Based on Motion? A Close Look at Motility Patterns in the Schistosome Life Cycle" Diagnostics 2016, 6, 24; doi:10.3390/diagnostics6020024, pp. 1-22.

Liu et al., "CMEIAS: A Computer-Aided System for the Image Analysis of Bacterial Morphotypes in Microbial Communities", Microb Ecol, Apr. 2001; 41(3): pp. 173-194.

Mell et al., "The NIST Definition of Cloud Computing", National Institute of Standards and Technology, Special Publication 800-145, Sep. 2011, pp. 1-7.

Shen et al., "Note: An automated image analysis method for high-throughput classification of surface-bound bacterial cell motions." Review of Scientific Instruments 86, 126104 (2015), pp. 1-4.

Balagurusamy, "Detecting and discriminating between different types of bacteria with a low-cost smart-phone based microscope and neural network models." Paper 11087-13, Biosensing and Nanomedicine XII, Conference 11087. https://spie.org/OPN/conferencedetails/biosensing-nanomedicine [Accessed May 25, 2019], p. 1 of 1.

Zielinski et al., "Deep Learning Approach to Bacterial Colony Classification", Sep. 14, 2017, Plos One, https://doi.org/10.1371/jornal.pone.0184554, pp. 1-8.

UK Examination Report, Reference P201901490GB01, entitled: "Bacteria Classification", Filed Jul. 30, 2022, Application No. GB2202217.2, Date of Report: Oct. 10, 2022, pp. 1-4.

\* cited by examiner

BACTERIA CLASSIFICATION

BACKGROUND

The exemplary embodiments relate generally to the classification of bacteria, and more particularly to the classification of bacteria based on bacteria morphology and motility.

Industries such as the food and health industry are concerned about the presence of bacteria such as *E. Coli, Salmonella, Listeria*, and *Campylobacter* in consumer food. Because these bacteria multiply and grow when environmental and nutritional conditions are right, they can rapidly grow into micro colonies and further into macroscopic thin biofilms that pose a potential threat to consumers in just hours. For this reason, food providers such as meat and produce producers are required to limit such bacteria within products to very low amounts, for example ten colony forming units (cfu) per milliliter, or 10 cfu/ml. Current methods used by the food industry to determine types of bacteria within food include an enrichment process in which the sample is tested over 8-24 hours, during which time the bacterial count grows to 104 cfu/ml. Once this concentration of bacteria is available for testing, polymerase-chain reactions (PCR) or DNA sequencing methods are used to identify specific types of bacteria based on their DNA, however these methods are lacking in efficiency and ease.

SUMMARY

The exemplary embodiments disclose a method, a computer program product, and a computer system for identifying bacteria based on morphology and motility. The method may comprise extracting a morphology signature corresponding to one or more bacteria and extracting a motility signature corresponding to the one or more bacteria. The method further may further comprise merging the morphology signature and the motility signature into a merged vector signature and classifying the one or more bacteria based on the merged vector signature.

According to some embodiments, extracting the morphology signature may be based on comparing a morphology of the one or more bacteria to a model correlating bacteria morphology with bacteria type.

In embodiments, the model correlating bacteria morphology with bacteria type may include features selected from a group comprising cell size, cell shape, cell length, cell diameter, cell volume, and gram stain type.

According to some embodiments, extracting the motility signature may be based on comparing a motility of the one or more bacteria to a model correlating bacteria motility with bacteria type.

In embodiments, the model correlating bacteria motility with bacteria type may include features selected from a group comprising a run length, an average run length, a run velocity, an average run velocity, a tumble length, an average tumble length, a tumble velocity, an average tumble velocity, and a tumble interval.

According to some embodiments, the model correlating bacteria motility with bacteria type may further include the feature replication rate.

In embodiments, the morphology signature, the motility signature, and the merged vector signature may be generated via artificial intelligence algorithms.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
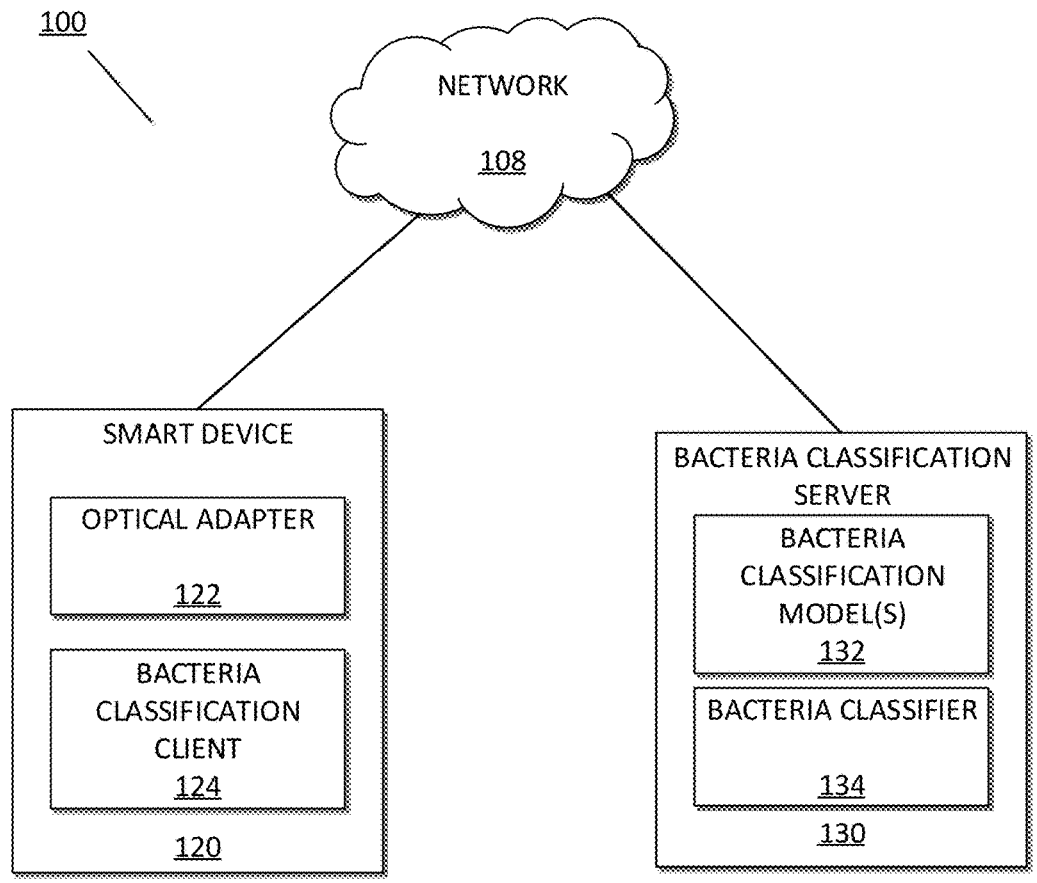
FIG. 1 depicts an exemplary schematic diagram of a bacteria classification system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Industries such as the food and health industry are concerned about the presence of bacteria such as *E. Coli, Salmonella, Listeria*, and *Campylobacter* in consumer food. Because these bacteria multiply and grow when environmental and nutritional conditions are right, they can rapidly grow into micro colonies and further into macroscopic thin biofilms that pose a potential threat to consumers in just hours. For this reason, food providers such as meat and produce producers are required to limit such bacteria within products to very low amounts, for example ten colony forming units (cfu) per milliliter, or 10 cfu/ml. Current methods used by the food industry to determine types of bacteria within food include an enrichment process in which the sample is tested over 8-24 hours, during which time the bacterial count grows to $10^4$ cfu/ml. Once this concentration of bacteria is available for testing, polymerase-chain reactions (PCR) or DNA sequencing methods are used to identify specific types of bacteria based on their DNA, however these methods are lacking in efficiency and ease.

Exemplary embodiments disclose a means for imaging bacteria using a low-cost microscope, then classifying the bacteria based on multi-layered or deep learning neural networks and computer vision techniques. Highlights of the exemplary embodiments include a customized, low-cost microscope for imaging and classifying bacteria in liquids or on solid surfaces using artificial intelligence models. Exemplary embodiments improve on existing solutions by not only utilizing artificial intelligence algorithms to identify individual bacteria, but doing so in a faster, more efficient, more inexpensive, and accurate manner using a low-cost microscope.

FIG. 1 depicts the bacteria classification system 100, in accordance with exemplary embodiments. According to the exemplary embodiments, the bacteria classification system 100 may include a smart device 120 and a bacteria classification server 130, which may be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted. For example, in embodiments, the bacteria classifier 134 and necessary components may be entirely stored on the smart device 120 for use locally without the need to connect to the network 108. The operations of the bacteria classification system 100 are described in greater detail herein.

In the exemplary embodiments, the network 108 may be a communication channel capable of transferring data between connected devices. Accordingly, the components of the bacteria classification system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In exemplary embodiments, the smart device 120 includes an optical adapter 122 and a bacteria identification client 124, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. In embodiments, the smart device 120 may be a measuring instrument such as a digital camera, imager, compound light microscope, stereo microscope, digital microscope, a USB computer microscope, a pocket microscope, an electron microscope, a scanning probe microscope, an acoustic microscope, and the like, preferably with an optical resolution of 1 micron or greater. The smart device 120 may have an adjustable optical resolution, but in the example embodiment may have an optical resolution of one micron for imaging bacteria 1-10 microns in length. It will be appreciated that the optical resolution of the smart device 120 may be varied based on application, and it will be further appreciated that achieving such optical resolutions may require use of an enhancing device, such as an optical adapter 122, described in greater detail herein. While the smart device 120 is shown as a single device, in other embodiments, the smart device 120 may be comprised of a cluster or plurality of computing devices, in a modular manner, etc., working together or working independently. The smart device 120 is described in greater detail as a hardware implementation with reference to FIG. 9, as part of a cloud implementation with reference to FIG. 10, and/or as utilizing functional abstraction layers for processing with reference to FIG. 11.

In exemplary embodiments, the optical adapter 122 may be a device capable of enhancing sensory data collection. In the example embodiment, such modification may include magnification, illumination, resolution, processing, filtering, reducing noise, etc. For example, the optical adapter 122 may be a lens capable of magnifying an image captured by a smart phone (the smart device 120) for more advanced analysis. It may also have specialized lens to image with very low image distortion, special illumination, and optics for obtaining images of bacteria with good contrast from a background. The optical adapter 122 may increase optical resolution of images captured by the smart device 120, and may magnify the image (e.g., 15 to 100 times) with a resolution of, for example, one micron. In other embodiments, the optical adapter 122 may include a light source, zoom and focus adjusters, hardware for mounting the optical adapter 122 to the smart device 120, microfluidic containment cells for housing bacterial culture samples, a sample stage for viewing the samples, and other equipment. The microfluidic containment cells for housing the bacterial culture samples may store 3-10 μl of bacterial culture samples. It will be appreciated that in embodiments where the smart device 120 is capable of achieving desired optical resolutions without the use of the optical adapter 122, such as a digital microscope, such enhancement via the optical adapter 122 may not be necessary, and thus omitted from such embodiments.

The bacteria classification client 124 may act as a client in a client-server relationship, and may be a software and/or hardware application capable of communicating with and providing a user interface for a user to interact with a server and other computing devices via the network 108. Moreover, in the example embodiment, the bacteria classification client 124 may be capable of transferring data from the smart device 120 to and from other devices via the network 108. In embodiments, the bacteria classification client 124 utilizes various wired and wireless connection protocols for data transmission and exchange, including Bluetooth, 2.4 gHz and 5 gHz internet, near-field communication, Z-Wave, Zigbee, etc. The bacteria classification client 124 is described in greater detail with respect to FIG. 2-5.

In the exemplary embodiments, the bacteria classification server 130 may include one or more bacteria classification models 132 and a bacteria classifier 134, and may act as a server in a client-server relationship with the bacteria classification client 124. The bacteria classification server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the bacteria classification server 130 is shown as a single device, in other embodiments, the bacteria classification server 130 may be comprised of a cluster or plurality of computing devices, working together or working independently. The bacteria classification server 130 is described in greater detail as a hardware implementation with reference to FIG. 9, as part of a cloud implementation with reference to FIG. 10, and/or as utilizing functional abstraction layers for processing with reference to FIG. 11.

The bacteria classification models 132 may be one or more algorithms modelling a correlation between one or more types of bacteria and one or more characteristics exhibited by the one or more types of bacteria, or features. For example, such bacteria may include *E. Coli, Bacillus, Salmonella, Listeria, Campylobacter*, and other *Staphylococcus* bacteria, while such correlated features may include bacteria morphology (e.g., bacteria size, shape, length, diameter, volume, color, etc.), bacteria motility (e.g. movement, swimming speed, run time, tumble time), colony patterns growth rate, reproduction rate, stain response, and other sources of data amenable to artificial intelligence analysis. In the example embodiment, the bacteria classification models 132 may be generated individually for specific bacteria, as well as for different life stages of the bacteria in both liquid cultures, in biofilms, and on solid surfaces. The bacteria classification models 132 may be generated using machine learning methods such as neural networks, deep learning neural networks, computer vision techniques, particle tracking algorithms etc. in order to model a likelihood of one or more of the features being indicative of a type of bacteria. In embodiments, such features may be weighted by the model based on a likelihood that a feature is indicative of a correct bacteria, and such weights may be tweaked through use of a feedback loop. The bacteria classification models 132 are described in greater detail with reference to FIG. 2-5.

In the exemplary embodiments, the bacteria classifier 134 may be a software and/or hardware program capable of receiving a bacterial culture sample, as well as receiving adjustments to a focus and zoom of the bacterial culture sample. The bacteria identifier is further capable of recording a video of the bacteria at the adjusted zoom and focus at particular frame rates for given elapsed durations. The bacteria classifier 134 is additionally capable of extracting sequential frames of the bacterial culture sample from the recorded video, and extracting a morphology and motility vector signature of the bacterial culture sample. The bacteria classifier 134 is capable of merging the morphology and motility vector signatures and classifying the bacterial culture sample based comparing the merged vector signature to a model. The bacteria classifier 134 is described in greater detail with reference to FIG. 2-5.

Figure 2:
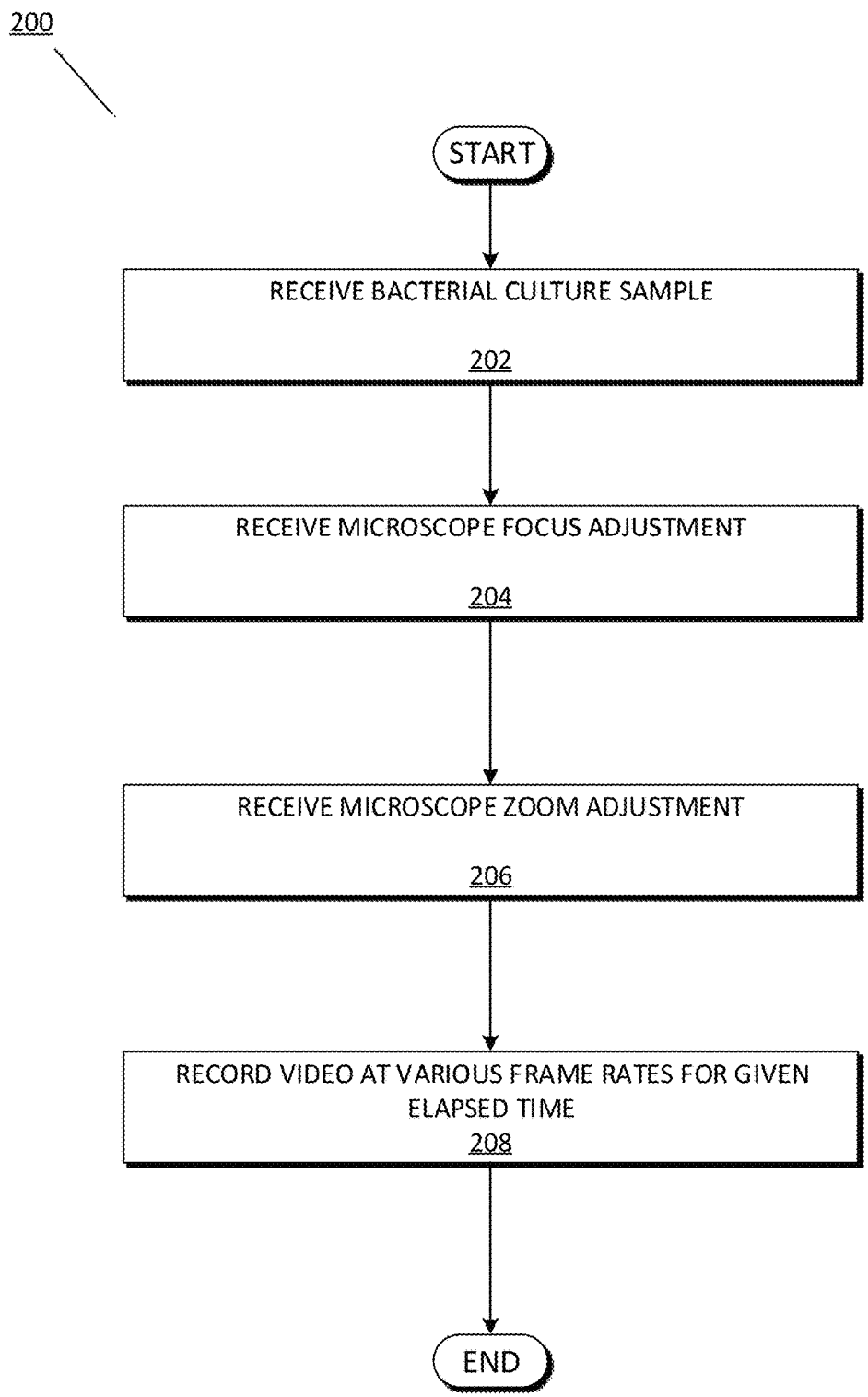
FIG. 2 depicts an exemplary flowchart 200 illustrating the operations of a bacteria classifier 134 of the bacteria classification system 100 in recording bacteria using a smart device microscope, in accordance with the exemplary embodiments.

FIG. 2 depicts an exemplary flowchart illustrating the operations of a bacteria classifier 134 of the bacteria classification system 100 in recording bacteria using a smart device microscope, in accordance with the exemplary embodiments.

The bacteria classifier 134 may receive a bacterial culture sample (step 202). In the example embodiments, the bacteria classifier 134 may receive a culture sample present within a liquid or on top of a solid surface. In embodiments classifying the bacterial culture sample within a liquid, the sample may be 3-10 microliters and, in embodiments utilizing the optical adapter 122, the samples may be contained in microfluidic sample containment cells. In embodiments classifying bacteria on a surface, the surface may be several square centimetres. In both liquid and solid surface embodiments, the bacterial culture sample may be centered within a view or sample stage of the smart device 120 or the optical adapter 122. For example, the bacterial culture sample may be a microfluidic cell of 4 microliters that contains unknown bacteria. In other embodiments, the bacteria classifier 134 may be mounted on an x-y translation stage in order to scan larger areas such as a benchtop work surface.

The bacteria classifier 134 may receive a microscope focus adjustment (step 204). In the example embodiment, the bacteria classifier 134 may receive a microscope focus adjustment in order to change the focal plane of the smart device 120 by way of a physical actuator, such as knobs, sliders, buttons, etc., or by way of digital means such as a touchscreen having digital knobs, sliders, buttons, etc., controlling the physical actuator electrically. In embodiments, the bacteria classifier 134 may receive the focus adjustment via the smart device 120 or, in embodiments implementing image enhancement via the optical adapter 122, the bacteria classifier 134 may receive the focus adjustment via the optical adapter 122. For example, the optical adapter 122 may have a knob for adjusting a distance or angle between one or more lenses of the optical adapter 122 and the smart device 120, thereby changing the focus of the smart device 120.

The bacteria classifier 134 may receive a microscope zoom adjustment (step 206). In the example embodiment, the bacteria classifier 134 may receive a microscope zoom adjustment to change an angle of view of the smart device 120 by way of a physical actuator, such as knobs, sliders, buttons, etc., or by way of digital means such as a touchscreen having digital knobs, sliders, buttons, etc. In embodiments, the bacteria classifier 134 may receive the zoom adjustment via the smart device 120 or, in embodiments implementing image enhancement via the optical adapter 122, the bacteria classifier 134 may receive the zoom adjustment via the optical adapter 122. For example, the optical adapter 122 may have a knob for adjusting a distance or angle between one or more lenses of the optical adapter 122 and the smart device 120, thereby changing a focus of the smart device 120.

The bacteria classifier 134 may record video at various frame rates for a given elapsed time (step 208). In embodiments, the bacteria classifier 134 may record the bacteria at a resolution of 1 micron and frame rate of 25-250 frames per second for a duration of 1-2 minutes. It will be appreciated, however, that the bacteria classifier 134 may be configured to record the bacteria at various resolutions, frame rates, and durations based on bacteria, equipment, and application. In the example embodiment, the recorded video may be transferred from the bacteria classification client 124 to the bacteria classification server 130 via the network 108, while in other embodiments, the recorded video may be stored and analysed locally on the smart device 120.

Figure 3:
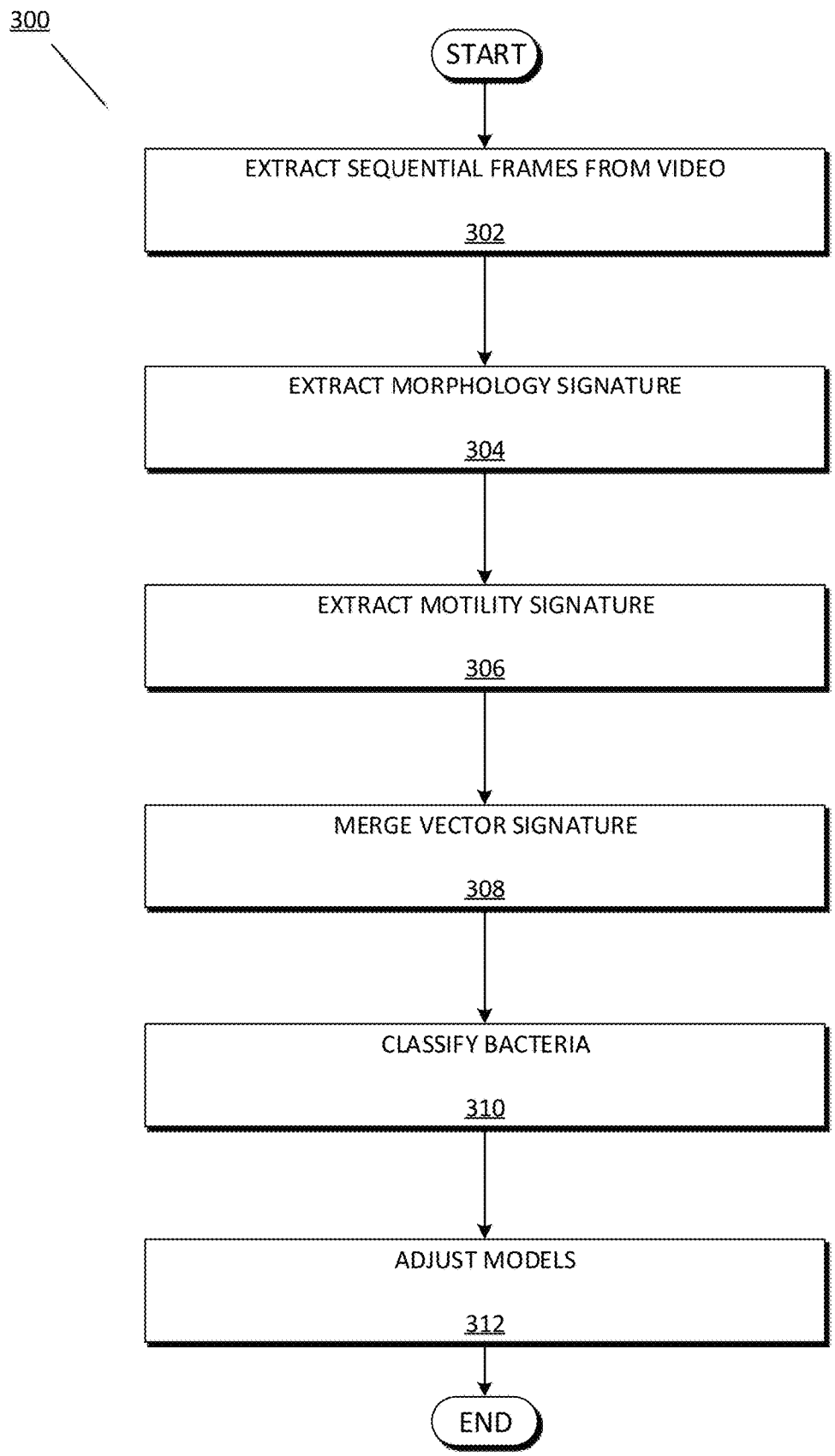
FIG. 3 depicts an exemplary flowchart 300 illustrating the general operations the bacteria classifier 134 of the bacteria classification system 100 in classifying bacteria using morphology and motility signatures, in accordance with the exemplary embodiments.
Figure 4:
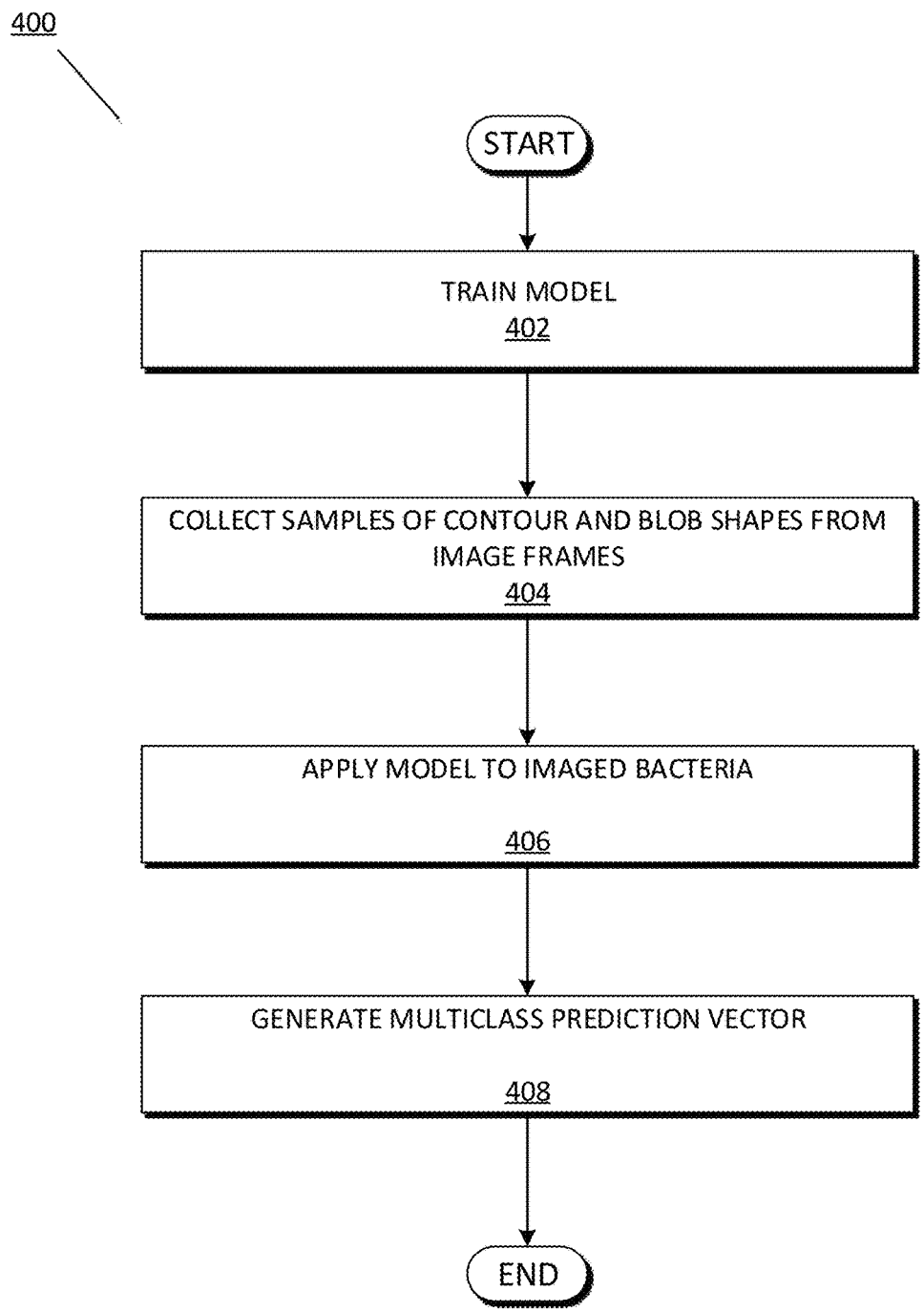
FIG. 4 depicts an exemplary flowchart 400 illustrating the operations the bacteria classifier 134 of the bacteria classification system 100 in extracting a bacterial morphology signature, in accordance with the exemplary embodiments.
Figure 5:
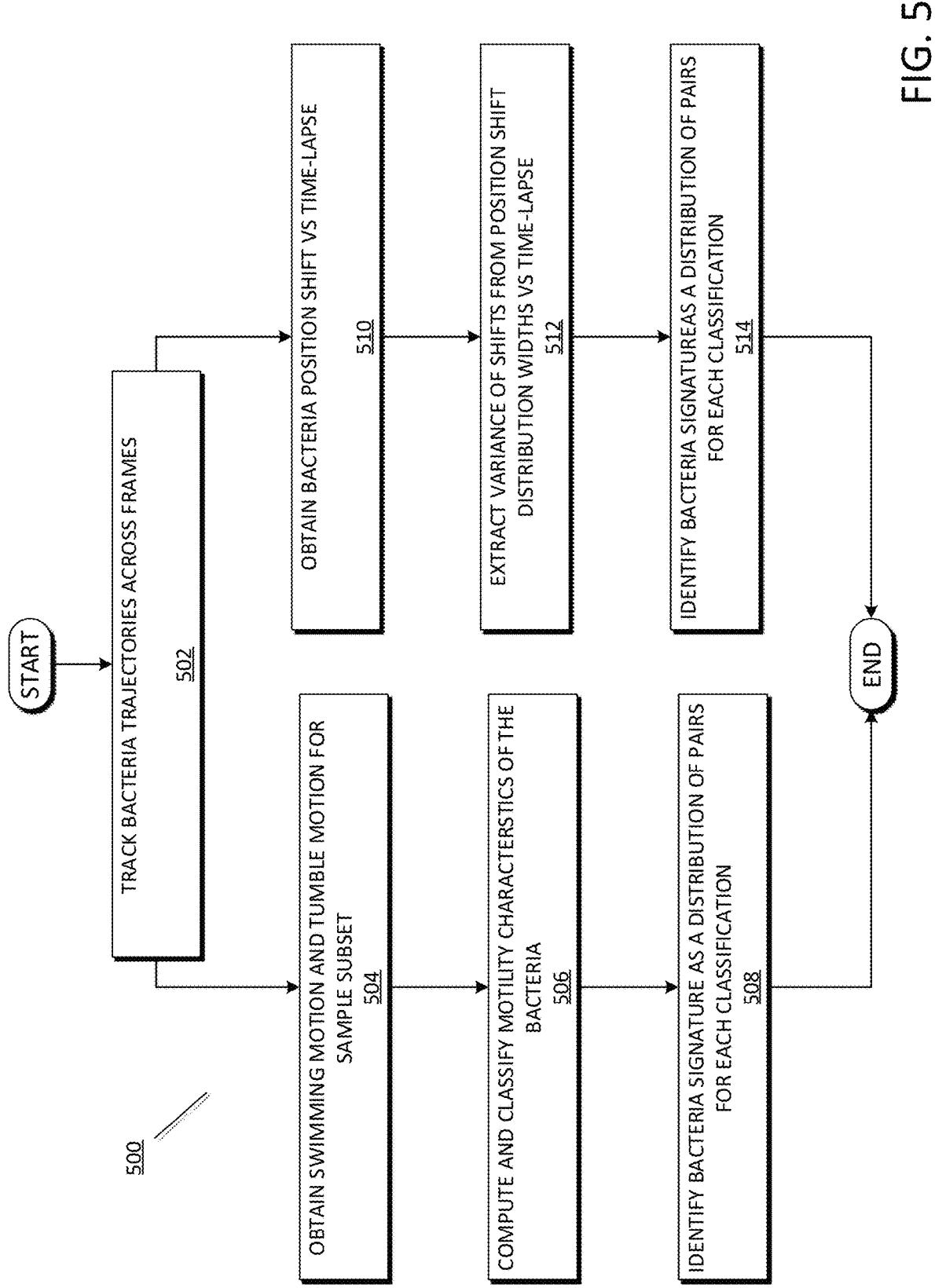
FIG. 5 depicts an exemplary flowchart 500 illustrating the operations the bacteria classifier 134 of the bacteria classification system 100 in extracting a bacterial motility signature, in accordance with the exemplary embodiments.

FIG. 3 depicts an exemplary flowchart illustrating the operations the bacteria classifier 134 of the bacteria classification system 100 in classifying bacteria using morphology and motility signatures, in accordance with the exemplary embodiments. It will be appreciated that FIG. 3 depicts a general overview of the operations of the bacteria classifier 134, while FIG. 4-5 provide a more detailed description of analysing bacteria morphology and motility, respectively.

The bacteria classifier 134 may extract sequential frames from a recorded video (step 302). In the example embodiment, the bacteria classifier 134 may extract any number of frames within the video framerate over any recorded duration sufficient to analyse a morphology and motility of a bacteria. Accordingly, and depending on a type of bacteria, the bacteria classifier 134 may extract a number of frames sufficient to identify a bacteria shape (e.g., size, diameter, volume, etc.), as well as a sufficient number of frames and duration to analyse a bacteria movement (e.g., run, tumble, reproduce/replicate). In embodiments, the desired frame rates may be fixed and periodic (e.g., one frame per second), while in others the frame rates may increase or decrease with time (e.g., increased frame rate extractions at later times throughout the duration). In further embodiments, frames may be analysed for particular phenomena and frames may be extracted or rates of frame extraction may be increased upon occurrences of the particular phenomena. Similarly, a duration over which frames are extracted may be fixed or variable, with some embodiments implementing a fixed duration while others implementing a shortened or extended duration based on bacterial activity or the occurrence of particular phenomena.

With reference to an illustrative example, the bacteria classifier 134 may extract frames at a rate of 25 frames per second for a duration of 2 minutes from a recorded video of 3 minutes depicting one or more bacteria.

The bacteria classifier 134 may extract a morphology signature (step 304). In the example embodiment, the extracted morphology signature is a representation of a bacteria with respect to characteristics such as pathogenic vs. non-pathogenic bacteria, gram stain type, shape, length, cell diameter, cell volume, etc. The bacteria classifier 134 may then determine a similarity of the extracted morphology signature to the morphology signature of classified bacteria in order to classify the unknown bacteria. The operations of the bacteria classifier 134 with respect to extracting a morphology signature are described in greater detail with respect to FIG. 4.

Continuing the illustrative example introduced above, the bacteria classifier 134 extracts a morphology signature of bacteria captured within the extracted frames.

The bacteria classifier 134 extracts a motility signature (step 306). In the example embodiment, the extracted motility signature is a representation of a bacteria with respect to an ability of the bacteria to move independently using metabolic energy. The motility signature may include characteristics such as bacteria run lengths/durations, bacteria run velocities and average velocities, bacteria tumbles and length/duration of tumbles, bacteria reproduction/replication rate, etc. The bacteria classifier 134 may then determine a similarity of the extracted motility signature to the motility signature of classified bacteria in order to classify the unknown bacteria. The operations of the bacteria classifier 134 with respect to extracting a motility signature are described in greater detail with respect to FIG. 5.

With reference again to the illustrative example previously introduced, the bacteria classifier 134 extracts a motility signature of bacteria captured within the extracted frames.

The bacteria classifier 134 may merge the morphology and motility signatures into a merged vector signature (step 308). In the example embodiment, the morphology and motility vector signatures are merged into a consolidated vector representative of the combined signatures. The bacteria classifier 134 may then compare the merged vector to a model using a threshold comparator, the result of which indicative of a type of bacteria present within the bacteria culture sample at a specified confidence level.

Returning to the illustrative example, the bacteria classifier 134 combines the morphology signature with the motility signature to create a merged vector signature.

The bacteria classifier 134 may classify and quantify the bacteria culture sample (step 310). In the example embodiment, the bacteria classifier 134 may classify the bacteria culture sample into one or more individual bacteria types based on the results of the threshold comparison between the merged vector and the model. For example, based on determining that the merged vector exceeds a similarity threshold to merged vectors of one or more known bacteria, the bacteria classifier 134 may classify the unknown bacteria as a known bacteria. In addition, because the bacteria classifier 134 is capable of classifying individual bacteria, the bacteria classifier 134 is capable of quantifying a concentration of the classified bacteria. In embodiments, the bacteria classifier 134 may be further configured to detect reproduction/replication of bacteria based on the morphology and motility analysis, thereby allowing the bacteria classifier 134 to consider bacteria reproduction rates when classifying bacteria. For example, the bacteria classifier 134 may compare the observed reproduction/replication rates to known bacteria reproduction/replication rates, then consider a determined similarity between the rates when classifying the bacteria. In addition, the bacteria classifier 134 may be further configured to leverage the detection of bacterial reproduction in order to distinguish between living and non-living cells. For example, the bacteria classifier 134 may determine a cell is non-living based on detecting very low reproduction rates and/or detecting a lag phase of the life bacteria cycle.

Figure 7:
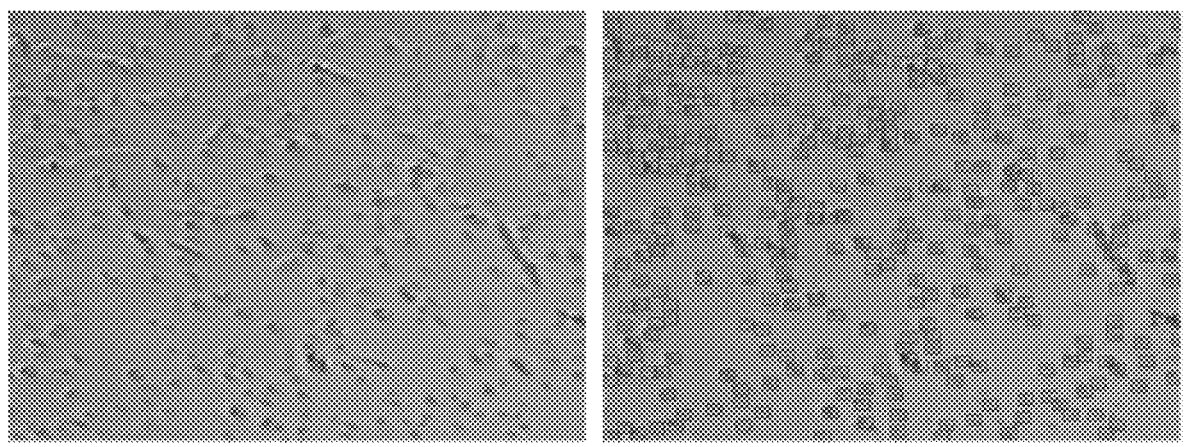
FIG. 7 depicts an example of the bacteria classifier 134 classifying *E. Coli* bacteria, in accordance with the exemplary embodiments.
Figure 8:
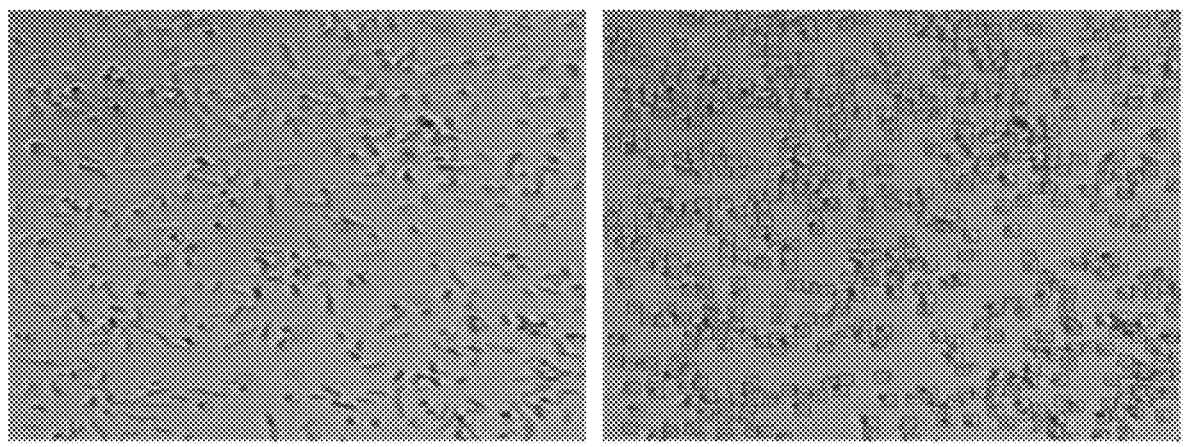
FIG. 8 depicts an example of the bacteria classifier 134 classifying *Bacillus Subtilis* bacteria, in accordance with the exemplary embodiments.

With reference to the illustrative example introduced above, the bacteria classifier 134 compares the merged vector of the bacteria culture sample to merged vectors of known bacteria to determine that the bacterial sample contains *E. Coli* and *Bacillus Subtilis*, as illustrated by FIG. 7-8.

The bacteria classifier 134 may adjust models (step 312). In embodiments, the bacteria classifier 134 may utilize received feedback in order to modify the bacteria classification models 132 and improve accuracy, speed, efficiency, etc. Accordingly, the bacteria classification models 132 may be configured to continuously modify/improve upon the bacteria classification models 132 when feedback information is available. The bacteria classifier 134 may receive feedback in several manners, such as user input, supervised/unsupervised training, extended analysis of additional information as the bacteria culture is further studied, etc. Such modifications to the bacteria classification models 132 may include adding/removing features, consolidating features, increasing/decreasing weights associated with particular features, etc. with respect to each type and life stage of bacteria. For example, the bacteria classifier 134 may increase weights associated with features relied upon in deducing a bacteria classification confirmed as correct through feedback, while decreasing weights associated with features relied upon in deducing a bacteria incorrectly. In a most simplistic manner, the bacteria classifier 134 may receive feedback from a user or administrator indicating that a correct or incorrect bacteria was identified, with embodiments implementing a rigorous training stage of the bacteria classification models 132 at initialization. The bacteria classifier 134 may request such feedback from a user or administrator randomly, at periodic intervals, in situations where the bacteria classifier 134 deduces a bacteria with below a threshold of certainty/probability, etc. In more complex embodiments, the bacteria classifier 134 may be configured to confirm previous bacteria classifications at a later time based on allowing the bacteria colonies to further develop, thereby reducing the difficulty in identifying them. Training of the bacteria classification models 132 is described in greater detail with respect to FIG. 4-5.

With reference again to the previously introduced example, the bacteria classifier 134 prompts a user to confirm that the classified bacteria is *E. Coli* and *Bacillus Subtilis*. Alternatively, the bacteria classifier 134 may reanalyse the bacteria after allowing several minutes to pass in order to gather more data and verify the results. Based on receiving confirmation that the bacteria classifier 134 identified the correct bacteria, the bacteria classifier 134 may increase weights associated with features relied upon in making the determination.

FIG. 4 depicts an exemplary flowchart illustrating the operations the bacteria classifier 134 of the bacteria classification system 100 in extracting a bacterial morphology signature 304, in accordance with the exemplary embodiments.

The bacteria classifier 134 may train a model correlating morphology of a cell with a bacteria class (step 402). In the example embodiment, the bacteria classifier 134 may train one or more models, i.e., the one or more bacteria classification models 132, capable of classifying one or more types, amounts, and life stages of bacteria based on one or more morphology characteristics exhibited by the one or more bacteria. In the example embodiment, the bacteria classifier 134 is trained to recognize and weight particular characteristics, or features, of the bacteria indicative of its identity and use those weighted features to calculate a value indicative of the bacteria class. The bacteria classifier 134 may be configured to identify any type of bacteria that exhibits identifiable characteristics, and such bacteria may include *E. Coli, Salmonella, Listeria, Campylobacter*, etc., while the features associated with bacteria may include size, length, cell diameter, cell volume, cell shape, cell color, gram stain type, cell reproduction, cell reproduction rate, etc. In the example embodiment, the bacteria classifier 134 may be trained to recognize and associated such features with bacteria through a supervised and/or unsupervised training process in which the bacteria classifier 134 observes features of various bacteria in liquid and on solid surfaces at all stages of the bacteria life cycle. In some embodiments, the bacteria classifier 134 may be trained by presenting the bacteria classifier 134 with images/video of various bacteria and configuring the bacteria classifier 134 to associate identified features with the annotated bacteria type. In such embodiments, the bacteria classifier 134 may then be tested and tuned using additional annotated images, however this time concealing the type of bacteria and tweaking the bacteria classification models 132 based on the later-revealed bacteria type. In other embodiments, supervised learning may be implemented wherein a moderator or administrator identifies bacteria within images, and the bacteria classifier 134 modifies weights accordingly. The bacteria classifier 134 may then use the generated models as a reference for comparison to unknown bacteria, described in greater detail forthcoming.

To further illustrate the operations of the bacteria classifier 134, reference is now made to an illustrative example where the bacteria classifier 134 is trained to identify bacteria types *E. Coli, Campylobacter, Listeria*, and *Salmonella*. Here, the bacteria classifier 134 is trained using the features of pathogenic vs. non-pathogenic bacteria, gram stem, shape, length, cell diameter, and cell volume, as shown in Table 1:

TABLE 1

| Bacteria Features | | | | | |
| --- | --- | --- | --- | --- | --- |
| | Gram stain | Shape | Length | Cell Diameter | Cell Volume |
| Non-pathogenic Bacteria | | | | | |
| PME1 (*E. coli*) | Negative | Rod-shaped | 2.0 um | 0.25-1.0 um | 0.6-0.7 um$^3$ |
| DH5a (*E. coli*) | Negative | Rod-shaped | 2.0 um | 0.25-1.0 um | 0.6-0.7 um$^3$ |
| PMR1 (*B. subtilis*) | Positive | Rod-shaped | 4.0-10 um | 0.25-1.0 um | 4.6 um$^3$ |
| Pathogenic Bacteria | | | | | |
| *E. Coli* O157:H7 | Negative | Rod-shaped | 2.0 um | 0.25-1.0 um | 0.6-0.7 um$^3$ |
| *Campylobacter* | Negative | Curved, comma-shaped | 0.5-5 um | 0.2-0.8 um | |

TABLE 1-continued

Bacteria Features

| | Gram stain | Shape | Length | Cell Diameter | Cell Volume |
|---|---|---|---|---|---|
| *Listeria* sp. | Positive | Short rods, coccobacilli | 0.5-2.0 um | 0.4-0.5 um | |
| *Salmonella* | Negative | Rod-shaped | 2-5 um | 0.7-1.5 um | |

The bacteria classifier 134 may collect samples of contour and blob shapes from unknown bacteria within the extracted image frames (step 404). In the example embodiment, the bacteria classifier 134 may use technologies such as edge detectors, Sobel filters, etc. in order to discern the contours and blobs of individual bacteria within the extracted frames. It may also pre-process the images to reduce noise and enhance the bacteria image segment features. In addition to identifying the edges of bacteria within the frames, the bacteria classifier 134 may further determine a size, gram stain type, shape, length, cell diameter, and cell volume of each of the identified cells within the image frame.

Continuing the illustrative example earlier introduced, the bacteria classifier 134 extracts a shape, length, diameter, and volume of the unknown bacteria.

The bacteria classifier 134 may apply the trained model to image frames of bacteria (step 406). In embodiments, the bacteria classifier 134 may be configured to apply the bacteria classification models 132 to the image frames of bacteria in order to classify one or more types of the one or more bacteria. As previously described, the one or more bacteria classification models 132 weight and correlate bacteria features with known bacteria classifications. Therefore, using the known correlations identified during the training phase, the bacteria classifier 134 is capable of applying the same models to unknown bacteria, the result of which is a value indicative of a most probable type of bacteria within the image. In embodiments, the bacteria classifier 134 may be configured to apply similarity measures, such as Siamese network similarities, to the known bacteria of the model and unknown bacteria of the image frames in order to determine a similarity measure of the two bacteria. Based on the similarity level exceeding a particular threshold, the bacteria classifier 134 may classify the unknown bacteria as a known classification. In addition, the model may be configured to weight such features according to accuracy such that features proven to correlate highly with particular bacteria are weighted more heavily, and relied upon more heavily during analyses. Conversely, those features with little correlation, though still valuable, are weighted less in the determination. Moreover, the bacteria classifier 134 may further tweak and refine these weights through use of a feedback loop, described in greater detail herein.

With reference again to the previously introduced example, the bacteria classifier 134 compares morphology features of the imaged bacteria, e.g., shape, size, etc., to the imaged bacteria.

The bacteria classifier 134 may generate a multiclass prediction vector (step 408). In the example embodiment, the generated multiclass prediction vector is a mapping from the feature set to a set of signatures. The bacteria classifier 134 utilizes a machine learning model that identifies as output in vector form the class the bacteria belongs to. For example, the bacteria classifier 134 may determine whether a bacteria is *E. Coli* or *Bacillus Subtilis* based on a binary classification of a vector of length 1. Similarly such a classification may be among multiple classes of bacteria, and each vector value represents a class.

With reference again to the previously introduced example, the bacteria classifier 134 generates a multiclass prediction vector in order to determine that *E. Coli* and *Bacillus Subtilis* are the most likely bacteria present within the sample based on bacteria morphology, relying heavily on cell length and cell diameter to classify the bacteria as *E. Coli* and *Bacillus Subtilis* (see FIG. 7-8).

FIG. 5 depicts an exemplary flowchart illustrating the operations the bacteria classifier 134 of the bacteria classification system 100 in extracting a bacterial motility signature 306, in accordance with the exemplary embodiments. It will be appreciated that in order to extract a motility signature of the bacteria, bacteria runs and tumbles must be distinguished from random motion. In order to distinguish runs and tumbles from random movement, the bacteria classifier 134 utilizes a comparison to Brownian random motion, described in greater detail below.

The bacteria classifier 134 may track one or more bacteria trajectories across one or more of the extracted image frames (step 502). In the example embodiment, the bacteria classifier 134 may track one or more bacteria trajectories by identifying the contours and blobs of the bacteria in a first frame, for example using an edge detector, and later identifying a same bacteria in subsequent image frames. Based on the distance travelled by the bacteria between image frames and the elapsed time between image frames, the bacteria classifier 134 is capable of determining a trajectory of the detected bacteria.

With reference again to the example above, the bacteria classifier 134 detects a bacteria within a first frame and a same bacteria having moved 0.5 µm distance between frames captured 38 milli seconds apart.

The bacteria classifier 134 may obtain swimming motion (run) and tumble motion for a sample subset (step 504). Based on the identified trajectories, the bacteria classifier 134 may obtain run and tumble motions of the bacteria. In the example embodiment, the bacteria classifier 134 may detect running/swimming motions by identifying relatively straight lines, e.g., lines without significant deviation from a path, within the trajectories of the bacteria (see FIG. 6). Such straight line motions may have a minimum threshold to be considered swimming, and for example may require an absolute straight line distance or, for example, straight line distance relative to the bacteria size or aspect ratio, etc. Such distances may be, for example, 10 bacteria lengths. The bacteria classifier 134 may additionally identify tumbles, or motions in which a bacteria turns, spins, rotates, etc., by, for example, identifying instances in which the bacteria has crossed its own path one or more times (see FIG. 7).

With reference again to the example above, the bacteria classifier 134 identifies bacteria having straight line movement before tumbling.

The bacteria classifier 134 may compute motility characteristics of the sample subset (step 506). In the example embodiment, the bacteria classifier 134 may utilize the trajectories of the bacteria in order to compute motility characteristics. For example, such motility characteristics may include a length of a run, an average length of a run, a velocity of a run, an average velocity of a run, a length of a tumble, an average length of a tumble, a velocity of a tumble, an average velocity of a tumble, tumble interval, etc. In the example embodiment, the bacteria classifier 134 may compute such characteristics by deducing a distance covered by the bacteria in an amount of time between image frames, thereby deducing a rate of movement.

In the example above, for instance, the bacteria classifier 134 determines that the bacteria having moved distance 51 μm over duration 3 seconds exhibited an average run length of 17 μm, an average run speed of 17 μm/second, and a tumble of interval of 1 second.

The bacteria classifier 134 may identify a bacteria signature as a distribution of pairs for each classification (step 508). In the example embodiment, the bacteria classifier 134 generates a motility signature as a distribution of pairs for each classification, namely average velocity and tumble interval.

With reference to the above example, the bacteria classifier 134 may generate a motility signatures based on the distribution of average run speed velocity of 17 μm/second and tumble of interval of 1 second.

The bacteria classifier 134 may obtain a bacteria position shift vs. time-lapse (step 510). In order to distinguish a run and tumble of the bacteria from random motion, the bacteria classifier 134 obtains a bacteria position shift vs. time-lapse. Here, the bacteria classifier 134 utilizes the trajectories of the bacteria across frames in order to compute position shift over time. For example, the bacteria classifier 134 may measure a distance moved by a bacteria within the sample between frames extracted at periodic intervals apart. Based on the distance and the time between frames, the bacteria classifier 134 may deduce a position shift vs. time-lapse.

Continuing the example above, the bacteria classifier 134 obtains a shift vs. lime-lapse based on movement over time of the bacteria.

The bacteria classifier 134 may extract variance of shifts from a position shift distribution vs. time-lapse (step 510). In the example embodiment, the bacteria classifier 134 generates a position shift distribution and determines a variance of the position shift vs. time-lapse data. In the example embodiment, the bacteria classifier 134 looks at the positional shift distributions of different sized bacteria, wherein the variance of smaller size bacteria will have larger variance and vice versa. Because this will also be dependent on the bacteria culture temperature, in embodiments, both samples are kept at roughly a same temperature.

The bacteria classifier 134 may classify a bacteria motility signature as a distribution of pairs for each classification (step 512). In the example embodiment, the bacteria classifier 134 generates a motility signature as a distribution of pairs for each classification, namely variance and time lapse. In the example embodiment, the motility features and/or signature distributions may be collected via, for example, trace vectors, rate of movement in a particular direction, velocity, diffusion, etc.

Returning to the previously-introduced example, the bacteria classifier 134 generates a motility signature based on the distribution of pairs of a variance and time lapse of the bacteria.

Figure 6:
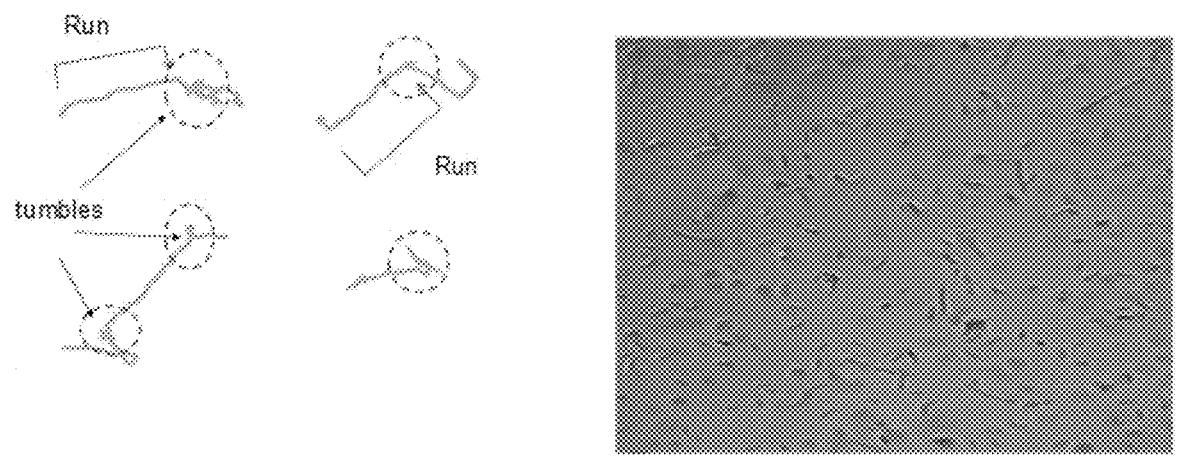
FIG. 6 depicts a run and tumble of bacteria analysed during the generation of a motility signature, in accordance with the exemplary embodiments.

FIG. 6 depicts a run and tumble of bacteria analysed during the generation of a motility signature, in accordance with the exemplary embodiments.

FIG. 7 depicts an example of the bacteria classifier 134 classifying *E. Coli* bacteria, in accordance with the exemplary embodiments.

FIG. 8 depicts an example of the bacteria classifier 134 classifying *Bacillus Subtilis* bacteria, in accordance with the exemplary embodiments.

Figure 9:
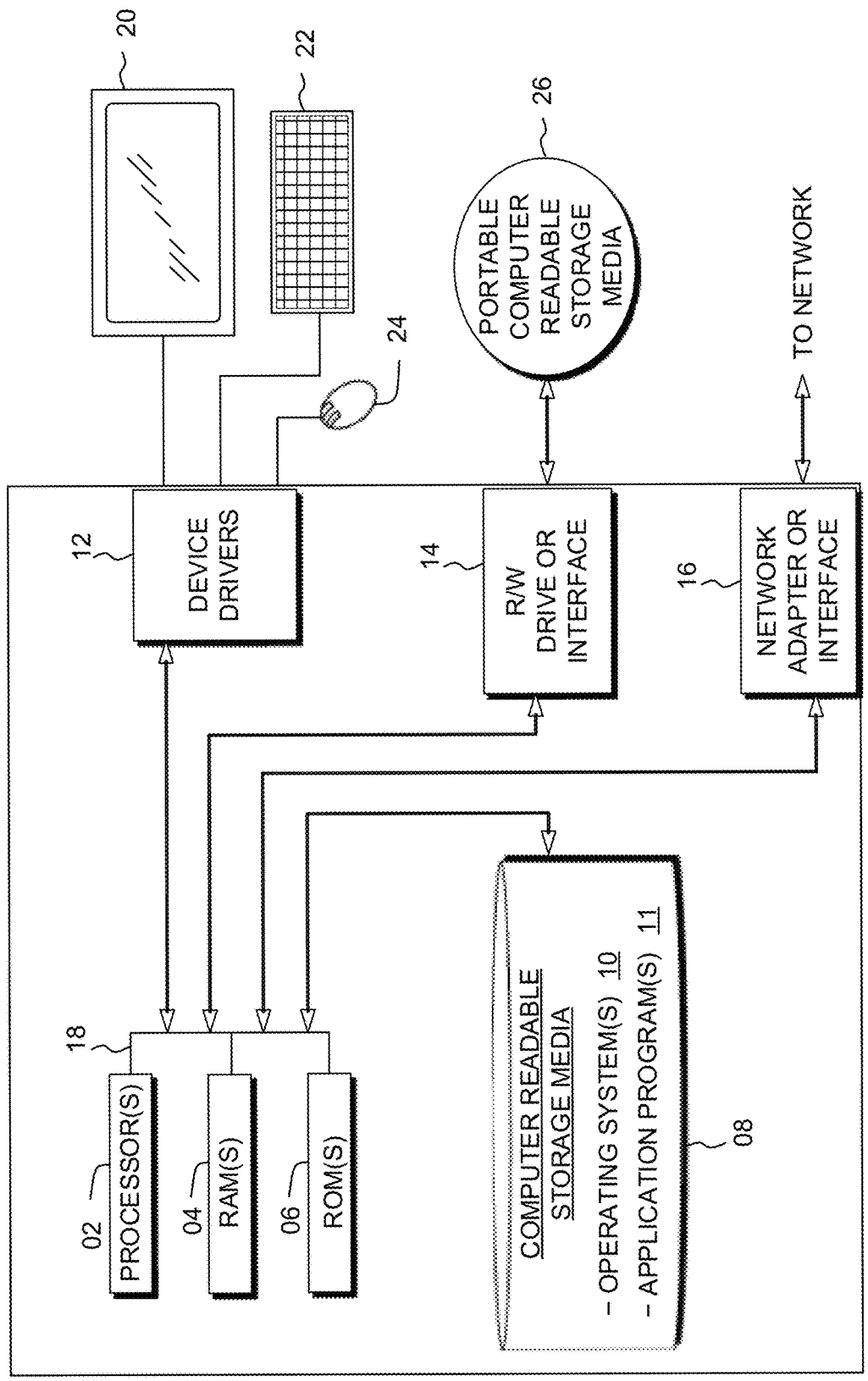
FIG. 9 depicts an exemplary block diagram depicting the hardware components of the interlocutor identifying system 100 of FIG. 1, in accordance with the exemplary embodiments.

FIG. 9 depicts a block diagram of devices within the bacteria classification system 100 of FIG. 1, in accordance with the exemplary embodiments. It should be appreciated that FIG. 9 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
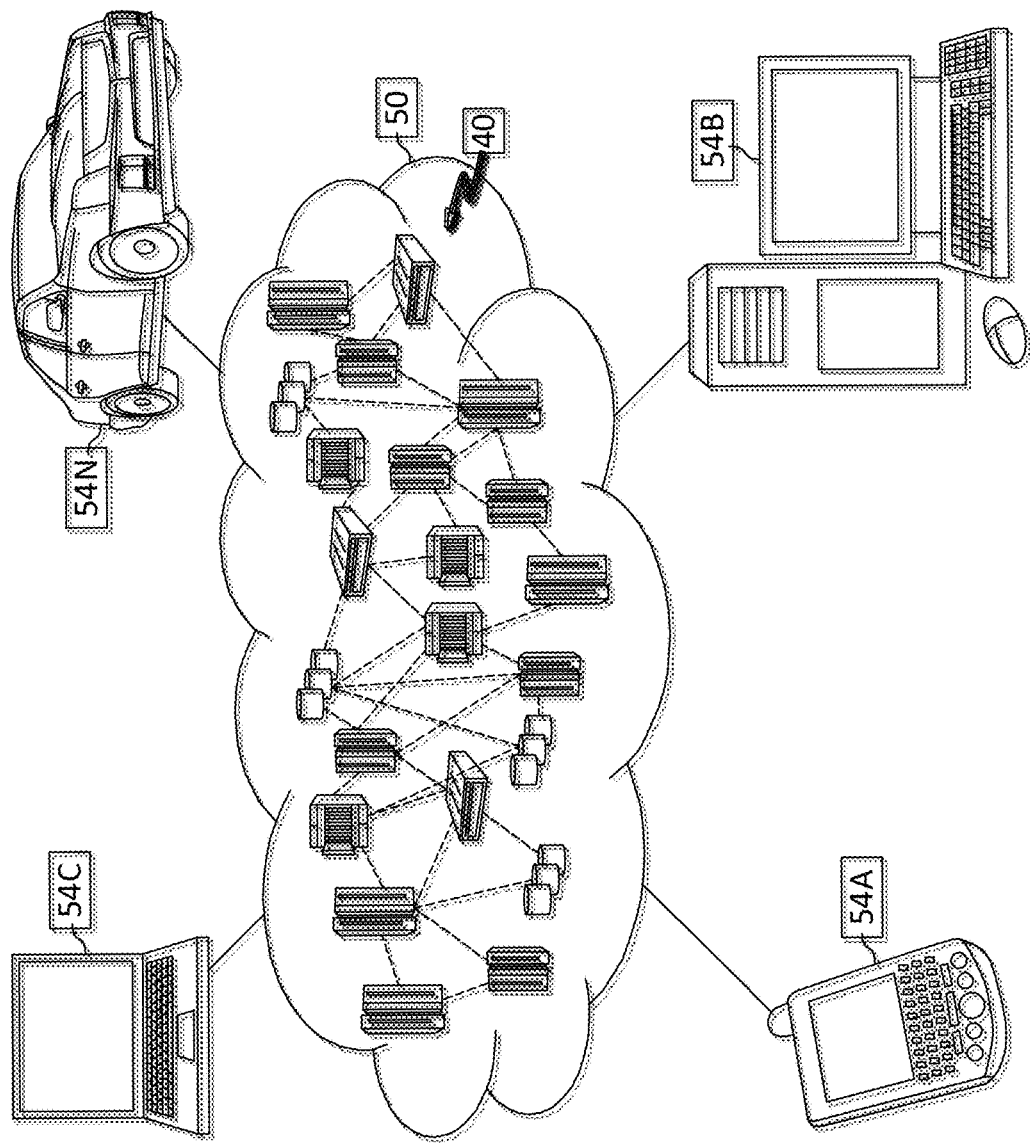
FIG. 10 depicts a cloud computing environment, in accordance with the exemplary embodiments.

Referring now to FIG. 10, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 40 and cloud computing environment 50 can communicate with any type of computerized device over any type of network and/or network addressable connection (e.g., using a web browser).

Figure 11:
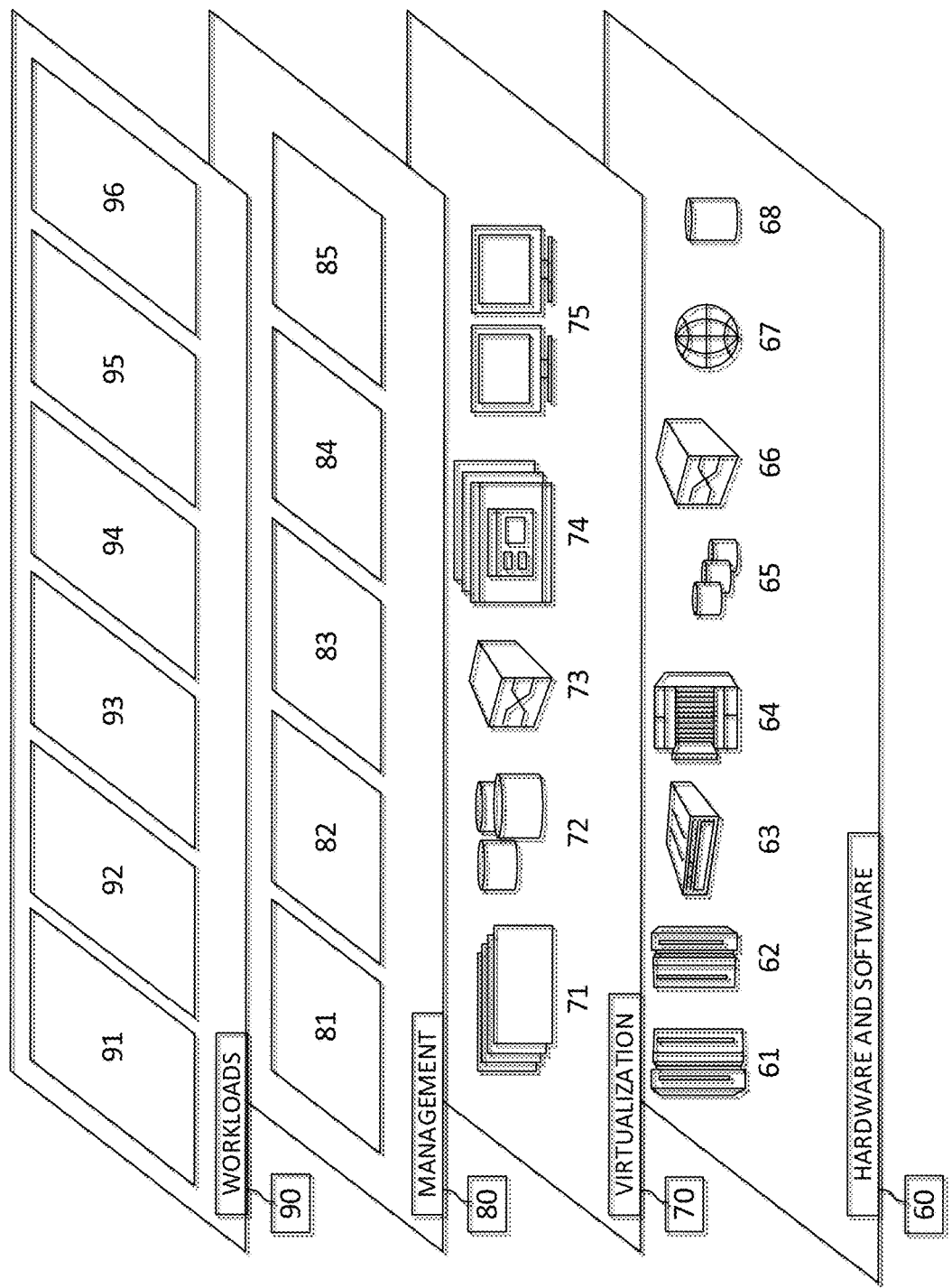
FIG. 11 depicts abstraction model layers, in accordance with the exemplary embodiments.

Referring now to FIG. 11, a set of functional abstraction layers provided by cloud computing environment 50 (FIG. 10) is shown. It should be understood in advance that the components, layers, and functions shown in FIG. 11 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and bacteria processing 96.

The exemplary embodiments may be a system, a method, and/or a computer program product at any possible technical detail level of integration. The computer program product may include a computer readable storage medium (or media) having computer readable program instructions thereon for causing a processor to carry out aspects of the exemplary embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the exemplary embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the exemplary embodiments.

Aspects of the exemplary embodiments are described herein with reference to flowchart illustrations and/or block diagrams of methods, apparatus (systems), and computer program products according to the exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various exemplary embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for classifying bacteria, the method comprising:
    extracting a morphology signature corresponding to one or more bacteria;
    extracting a motility signature corresponding to the one or more bacteria based on comparing a motility of the one or more bacteria to a model correlating bacteria motility with bacteria type, wherein features of the model correlating bacteria motility with bacteria type include replication rate;
    merging the morphology signature and the motility signature into a merged vector signature; and
    classifying the one or more bacteria based on the merged vector signature.

2. The method of claim 1, wherein extracting the morphology signature is based on comparing a morphology of the one or more bacteria to a model correlating bacteria morphology with bacteria type.

3. The method of claim 2, wherein the model correlating bacteria morphology with bacteria type includes features selected from a group consisting of cell size, cell shape, cell length, cell diameter, cell volume, and gram stain type.

4. The method of claim 1, wherein the model correlating bacteria motility with bacteria type further includes features selected from a group consisting of a run length, an average run length, a run velocity, an average run velocity, a tumble length, an average tumble length, a tumble velocity, an average tumble velocity, and a tumble interval.

5. A computer program product for classifying bacteria, the computer program product comprising:
    one or more non-transitory computer-readable storage media and program instructions stored on the one or more non-transitory computer-readable storage media capable of performing a method, the method comprising:
    extracting a morphology signature corresponding to one or more bacteria;
    extracting a motility signature corresponding to the one or more bacteria based on comparing a motility of the one or more bacteria to a model correlating bacteria motility with bacteria type, wherein features of the model correlating bacteria motility with bacteria type include replication rate;
    merging the morphology signature and the motility signature into a merged vector signature; and
    classifying the one or more bacteria based on the merged vector signature.

6. The computer program product of claim 5, wherein extracting the morphology signature is based on comparing a morphology of the one or more bacteria to a model correlating bacteria morphology with bacteria type.

7. The computer program product of claim 6, wherein the model correlating bacteria morphology with bacteria type includes features selected from a group consisting of cell size, cell shape, cell length, cell diameter, cell volume, and gram stain type.

8. The computer program product of claim 5, wherein the model correlating bacteria motility with bacteria type includes features selected from a group comprising a run length, an average run length, a run velocity, an average run velocity, a tumble length, an average tumble length, a tumble velocity, an average tumble velocity, and a tumble interval.

9. A computer system for classifying bacteria, the computer system comprising:
    one or more computer processors, one or more computer-readable storage media, and program instructions stored on the one or more of the computer-readable storage media for execution by at least one of the one or more processors capable of performing a method, the method comprising:
    extracting a morphology signature corresponding to one or more bacteria;
    extracting a motility signature corresponding to the one or more bacteria based on comparing a motility of the one or more bacteria to a model correlating bacteria motility with bacteria type, wherein features of the model correlating bacteria motility with bacteria type include replication rate;
    merging the morphology signature and the motility signature into a merged vector signature; and
    classifying the one or more bacteria based on the merged vector signature.

10. The computer system of claim 9, wherein extracting the morphology signature is based on comparing a morphology of the one or more bacteria to a model correlating bacteria morphology with bacteria type.

11. The computer system of claim 10, wherein the model correlating bacteria morphology with bacteria type includes features selected from a group consisting of cell size, cell shape, cell length, cell diameter, cell volume, and gram stain type.

12. The computer system of claim 9, wherein the model correlating bacteria motility with bacteria type includes features selected from a group comprising a run length, an average run length, a run velocity, an average run velocity, a tumble length, an average tumble length, a tumble velocity, an average tumble velocity, and a tumble interval.

\* \* \* \* \*